(12) United States Patent
Lin

(10) Patent No.: US 9,244,228 B2
(45) Date of Patent: Jan. 26, 2016

(54) FEMALE OPTICAL CONNECTOR

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/708,295

(22) Filed: May 11, 2015

(65) Prior Publication Data

US 2015/0241637 A1 Aug. 27, 2015

Related U.S. Application Data

(62) Division of application No. 13/596,040, filed on Aug. 27, 2012, now Pat. No. 9,057,847.

(30) Foreign Application Priority Data

May 16, 2012 (TW) .............................. 101117297 A

(51) Int. Cl.
*G02B 6/38* (2006.01)
*G02B 6/32* (2006.01)

(52) U.S. Cl.
CPC ................ *G02B 6/387* (2013.01); *G02B 6/383* (2013.01); *G02B 6/3849* (2013.01); *G02B 6/3853* (2013.01); *G02B 6/3874* (2013.01); *G02B 6/32* (2013.01); *G02B 6/3885* (2013.01)

(58) Field of Classification Search
CPC ........ G02B 6/32; G02B 6/383; G02B 6/3849; G02B 6/3885

USPC .......................... 385/58, 59, 70, 71, 74, 77–79
See application file for complete search history.

(56) References Cited

U.S. PATENT DOCUMENTS

| | | | | |
|---|---|---|---|---|
| 5,241,612 A * | 8/1993 | Iwama | ............................. | 385/74 |
| 5,708,745 A * | 1/1998 | Yamaji et al. | .................... | 385/92 |
| 6,039,585 A * | 3/2000 | Kim et al. | ...................... | 439/137 |
| 6,655,850 B2 * | 12/2003 | Mann et al. | ...................... | 385/74 |
| 7,775,725 B2 * | 8/2010 | Grinderslev | .................... | 385/74 |
| 7,985,026 B1 * | 7/2011 | Lin et al. | .......................... | 385/71 |
| 8,613,561 B2 * | 12/2013 | Ko et al. | ......................... | 385/93 |
| 8,858,094 B2 * | 10/2014 | Weinrotter et al. | ............. | 385/88 |

* cited by examiner

*Primary Examiner* — Daniel Petkovsek
(74) *Attorney, Agent, or Firm* — Novak Druce Connolly Bove + Quigg LLP

(57) ABSTRACT

A female optical connector includes a connector body, a hollow pusher, an optical fiber, lenses, and two elastic shielding plates. The connector body includes a coupling surface. The coupling surface defines a receiving hole with an opening. The connector body further includes an end surface, a first surface, and a second surface in the receiving hole. The end surface faces the opening and is interconnected between the first surface and the second surface. The hollow pusher extends from the end surface and is received in the receiving hole. The hollow pusher is spaced apart from the first and second surfaces. The lens is received in the receiving hole and optically coupled to the optical fiber. The elastic shielding plates have fixed ends fixed to the first surface and the second surface at opposite sides of the receiving hole, and opposite free ends overlappable to cover the opening.

5 Claims, 5 Drawing Sheets

FEMALE OPTICAL CONNECTOR

This application is a divisional application of a commonly-assigned allowed US patent application entitled "MALE OPTICAL CONNECTOR AND FEMALE OPTICAL CONNECTOR AND RELATED OPTICAL FIBER COUPLING ASSEMBLY," filed on Aug. 27, 2012 with U.S. Pat. No. 9,057,847. The disclosure of the above-identified application is incorporated herein by reference.

FIELD

The present disclosure relates to optical technology and, particularly, to a male optical connector, a female optical connector, and a related optical fiber coupling assembly.

BACKGROUND

Optical fiber coupling assemblies are preferred for use in data transmission between electronic devices due to their high transmission speed and signal integrity. The optical fiber coupling assembly includes two optical fiber connectors, such as a male optical connector and a female optical connector, for coupling the optical fibers together to allow optical transmittance between the optical fibers. The connectors include lenses each being aligned with a corresponding optical fiber. When coupling the two connectors together, a lens in the male optical connector is aligned with a corresponding lens in the female optical connector to ensure the optical transmittance. However, when the connector is detached from the other connector, the lenses are easily contaminated. This decreases transmission efficiency and destroys the signal integrity.

Therefore, it is desirable to provide a male optical connector, a female optical connector, and a related optical fiber coupling assembly, which can overcome or at least alleviate the limitations described.

BRIEF DESCRIPTION OF THE DRAWINGS

Implementations of the present technology will now be described, by way of example only, with reference to the attached figures.

DETAILED DESCRIPTION

Figure 1:
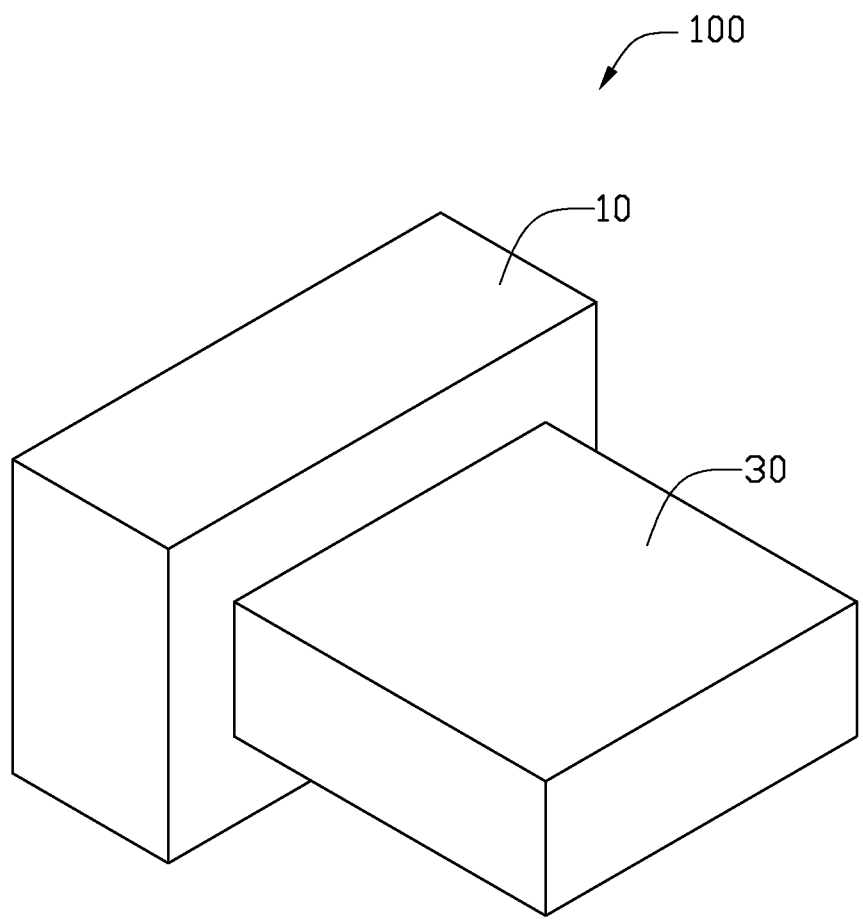
FIG. 1 is a schematic, isometric view of an optical fiber coupling assembly, according to an exemplary embodiment, showing the optical fiber coupling assembly in a coupled stated.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to mean essentially conforming to the particular dimension, shape, or other feature that is modified such that exactness does not apply. For example, substantially cylindrical means that the object resembles a cylinder, but can have one or more deviations from a true cylinder. The term "comprising," means "including, but not necessarily limited to" and specifically indicates open-ended inclusion or membership in the so-described combination, group, series and the like.

Referring to FIG. 1, an optical fiber coupling assembly 100, according to an exemplary embodiment, is shown. The optical fiber coupling assembly 100 includes a female optical connector 10 and a male optical connector 30. For example, the female optical connector 10 may be assembled in electronic devices (not shown), such as printers, cameras, and computer hosts. The male optical connector 30 may be assembled in some portable electronic devices or computer peripherals and is coupled with the female optical connector 10 for transmitting optical signals.

Figure 2:
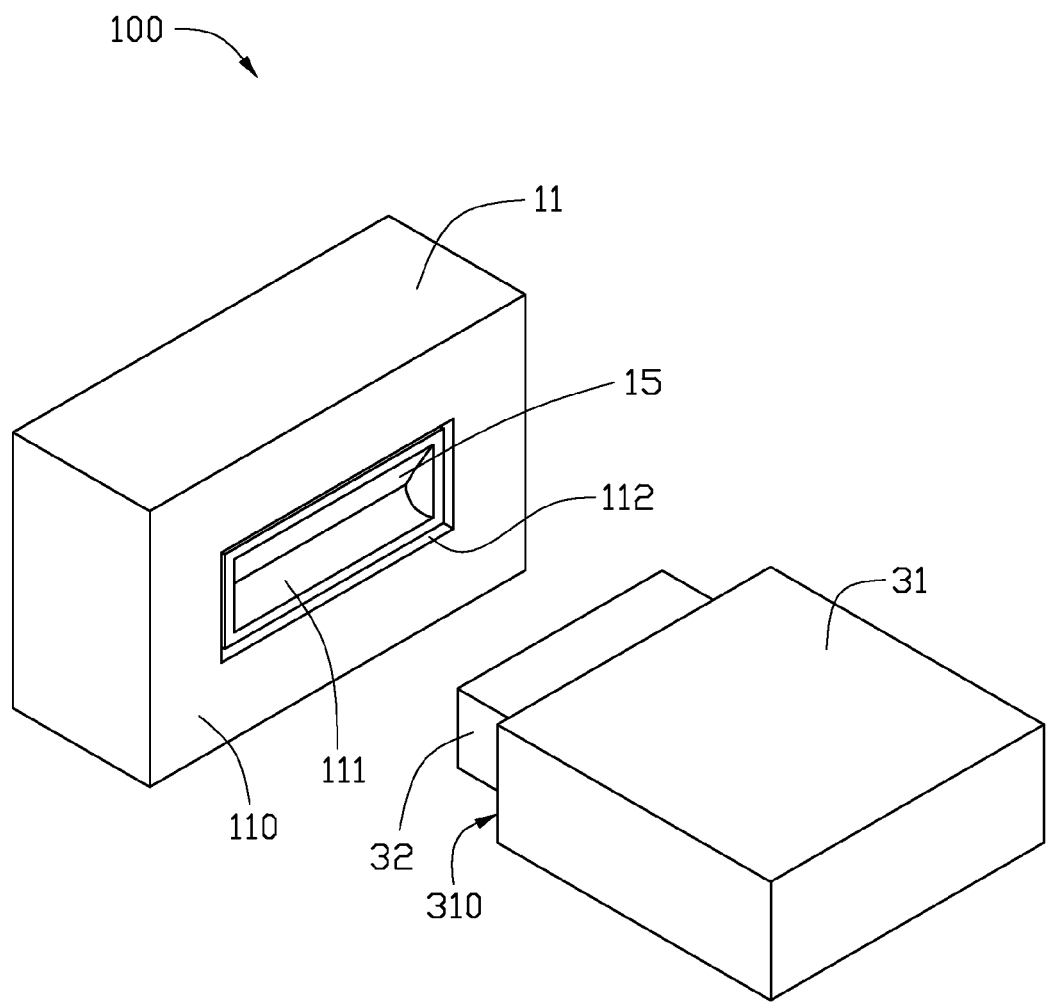
FIG. 2 is similar to FIG. 1, but showing the optical fiber coupling assembly in an uncoupled stated.
Figure 3:
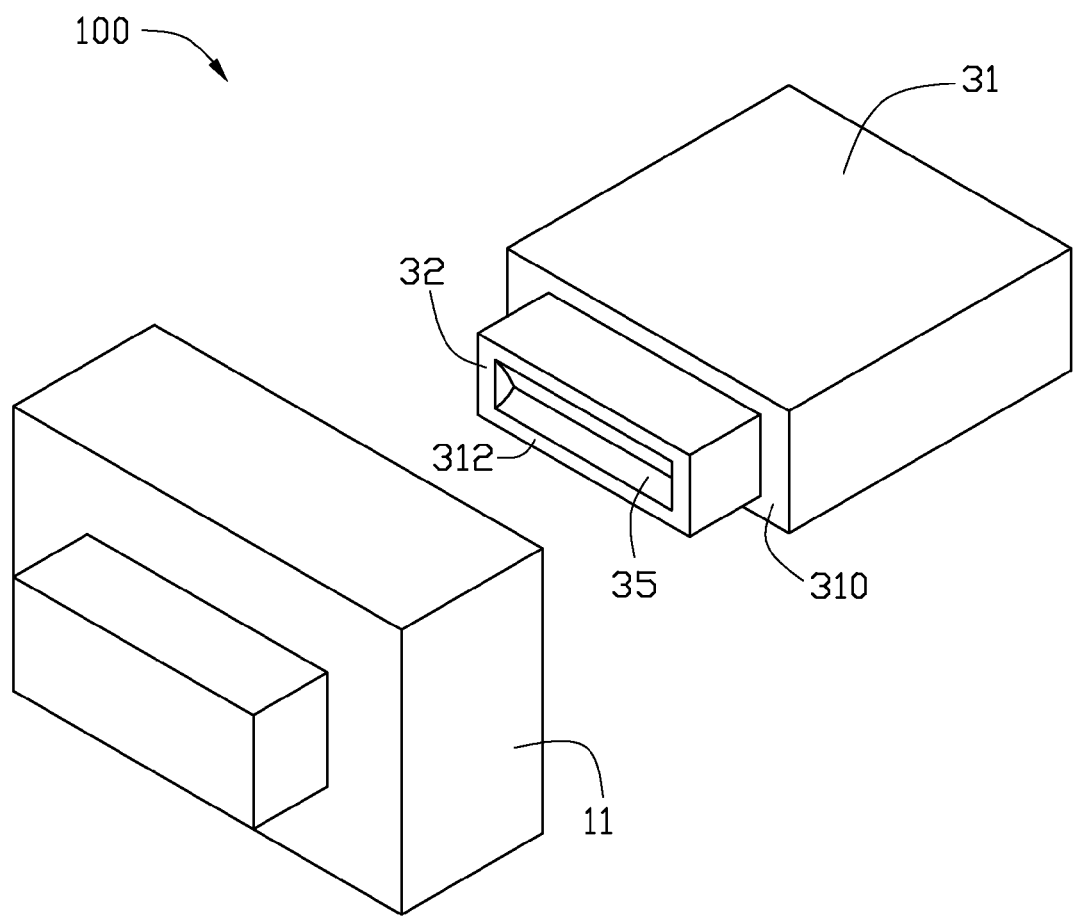
FIG. 3 is similar to FIG. 2, but viewed from another angle.
Figure 4:
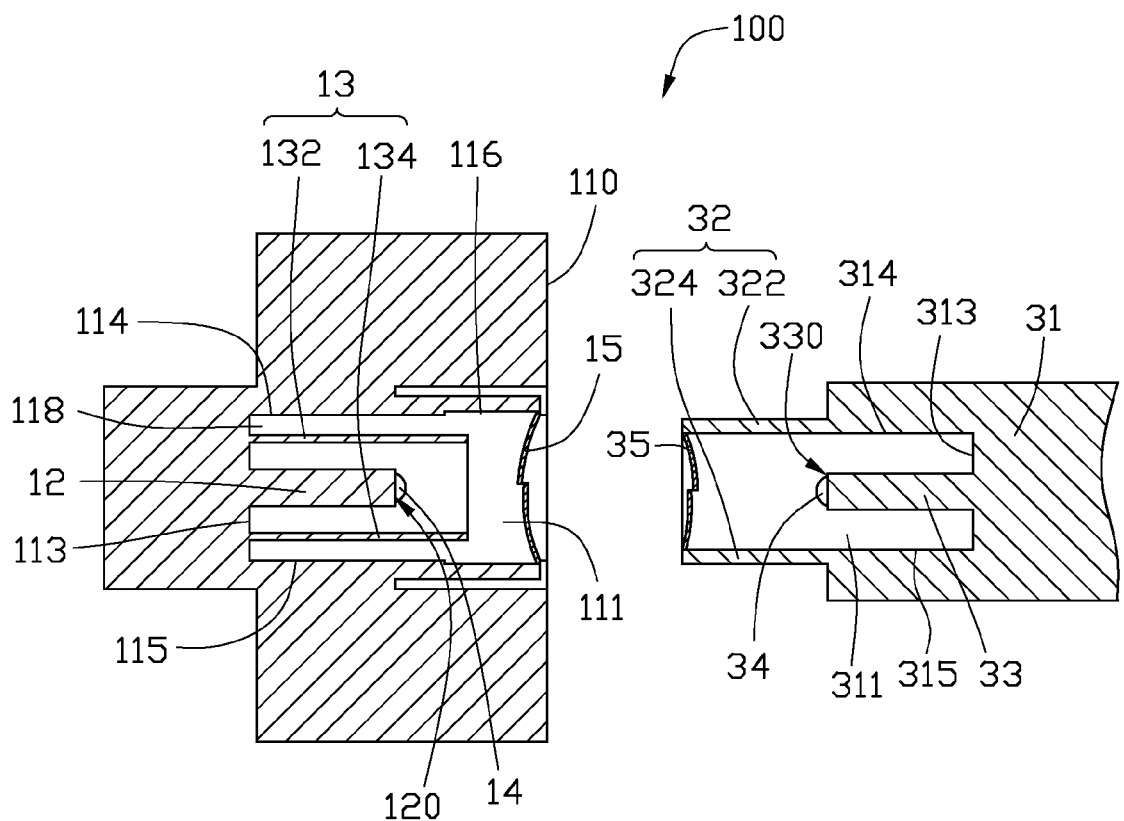
FIG. 4 is a cross sectional view of the optical fiber coupling assembly of FIG. 1, showing the optical fiber coupling assembly in an uncoupled stated.

Referring to FIGS. 2-4, the female optical connector 10 includes a female connecter body 11, a female support platform 12, a female hollow pusher 13, a female lens 14, and two elastic female shielding plates 15.

The female connecter body 11 includes a female coupling surface 110 facing the male optical connector 30. The female coupling surface 110 defines a female receiving hole 111 with a first opening 112. The female receiving hole 111 is rectangular and blind. The female connecter body 11 includes an end surface 113, a first surface 114, and a second surface 115 in the female receiving hole 111. The first surface 114 is substantially parallel to the second surface 115. The end surface 113 perpendicularly interconnects the first surface 114 and the second surface 115. Two recesses 116 are respectively defined in the first surface 114 and the second surface 115. The recesses 116 are positioned at a portion of the female receiving hole 111 opposite from the end surface 113.

The female support platform 12 begins adjacent to and extends away from the end surface 113. The female support platform 12 includes a first light receiving surface 120 at a distal portion thereof. The first light receiving surface 120 is substantially parallel to the end surface 113.

The female hollow pusher 13 is a rectangular frame and is received in the female receiving hole 111. The female hollow pusher 13 extends from the end surface 113 and the female support platform 12 is received in the empty portion of the female hollow pusher 13. The female support platform 12 may have a variety of cross-section shapes, such as, but not limited to square, rectangular, or cylindrical. The female hollow pusher 13 includes a top wall 132 and a bottom wall 134 substantially parallel to the top wall 132. The top wall 132 is adjacent to the first surface 114. The bottom wall 134 is adjacent to the second surface 115. A receiving space 118 is formed between the female hollow pusher 13 and the first and second surfaces 114, 115.

The female lens 14 is received in the female hollow pusher 13 and at least partially arranged on the first light receiving surface 120.

The female shielding plates 15 are made of elastic material, such as plastic, rubber, and metal sheet. Each first shielding plate 15 includes a first fixed end (not labeled) and a first free end (not labeled) opposite to the first fixed end. The two first fixed ends are fixed to the female connecter body 11 at opposite sides of the female receiving hole 111, and the two first free ends are free and overlappable to cover the first opening 112, thereby preventing contamination of the female lens 14. In detail, the first fixed ends are respectively fixed to the first surface 114 and the second surface 115.

The male optical connector 30 includes a male connecter body 31, a male hollow pusher 32, a male support platform 33, a male lens 34, and two male shielding plates 35.

The male connecter body 31 includes a male coupling surface 310 facing the female coupling surface 110. The male coupling surface 310 defines a male receiving hole 311 with a second opening 312. The male receiving hole 311 is rectangular and blind. The male connecter body 31 includes a connection surface 313, a first side surface 314, and a second side surface 315 in the male receiving hole 311. The first side surface 314 is substantially parallel to the second side surface 315. The connection surface 313 perpendicularly interconnects the first side surface 314 and the second side surface 315.

The male support platform 33 begins adjacent to and extends away from the connection surface 313. The male support platform 33 is aligned with the female support platform 12 and includes a second light receiving surface 330 at a distal portion thereof. The second light receiving surface 330 faces the first light receiving surface 120 and is substantially parallel to the connection surface 313. The male support platform 33 may have a variety of cross-section shapes, such as, but not limited to square, rectangular, or cylindrical.

The male hollow pusher 32 is a rectangular frame and extends from the male coupling surface 310. The male hollow pusher 32 includes an upper wall 322 and a lower wall 324 substantially parallel to the lower wall 324. The male hollow pusher 32 surrounds the male receiving hole 311. The upper wall 322 is coplanar with the first side surface 314. The lower wall 324 is coplanar with the second side surface 315.

The male lens 34 is received in the male hollow pusher 32 and at least partially arranged on the second light receiving surface 330. The male lens 34 is aligned with the female lens 14.

The male shielding plates 35 are made of elastic material, such as plastic, rubber, and metal sheet. Each second shielding plate 35 includes a second fixed end (not labeled) and a second free end (not labeled) opposite to the second fixed end. The two second fixed ends are fixed to opposite sides of the male hollow pusher 32, and the two second free ends are free and overlappable to cover the second opening 312, thereby preventing contamination of the male lens 34. In detail, the second fixed ends are respectively fixed to the upper wall 322 and the lower wall 324.

Figure 5:
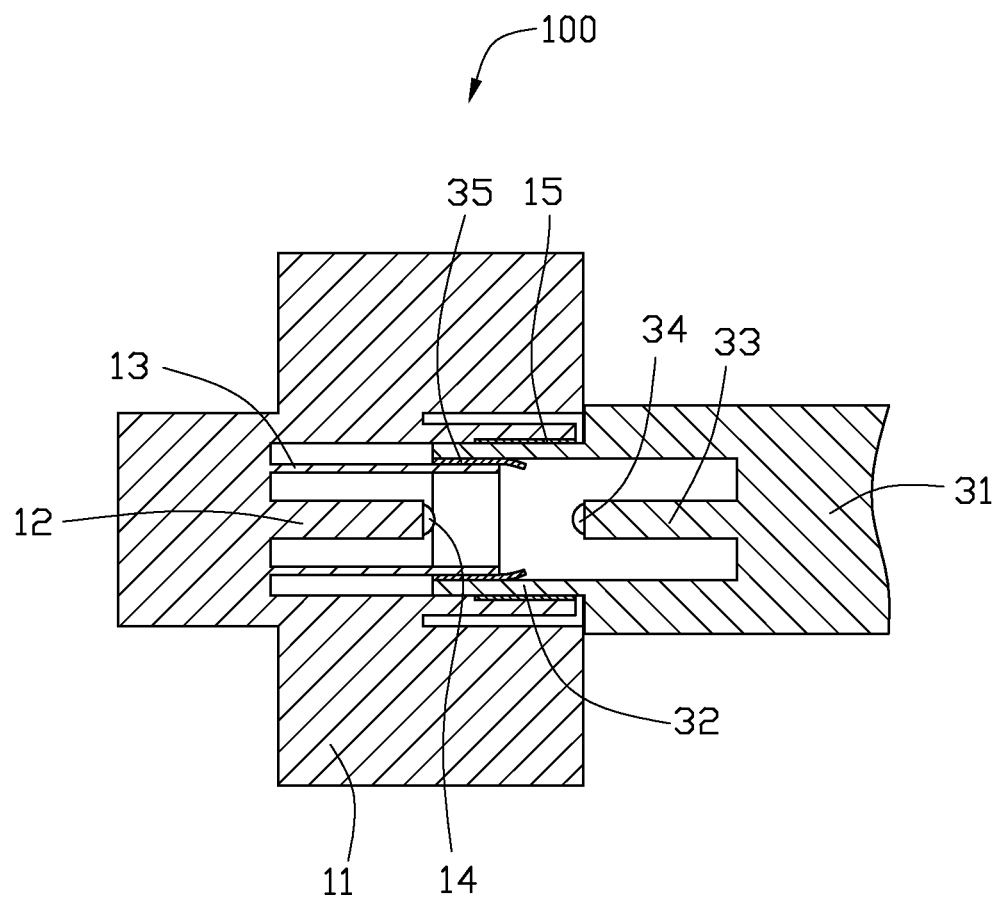
FIG. 5 is similar to FIG. 4, but showing the optical fiber coupling assembly in a coupled stated.

Referring to FIGS. 4-5, when the male optical connector 30 is inserted into the female optical connector 10, the male hollow pusher 32 pushes the female shielding plates 15 to separate and bend toward the recesses 116. When the male optical connector 30 is further inserted into the female optical connector 10, the female hollow pusher 13 pushes the male shielding plates 35 to separate and bend toward the upper and lower walls 322 and 324 until the female lens 14 is exposed to the male lens 34. In this situation, the male hollow pusher 32 is received in the receiving space 118. The female coupling surface 110 abuts the male coupling surface 310. The male hollow pusher 32 presses the female shielding plates 15 in the recesses 116. The male shielding plates 35 are pressed between the female hollow pusher 13 and the male hollow pusher 32. In detail, one of the male shielding plates 35 is positioned between the top wall 132 and upper wall 322, and the other one is positioned between the bottom wall 134 and the lower wall 324. Therefore, the female shielding plates 15 and the male shielding plates 35 are open. In other words, the light path between the female lens 14 and the male lens 34 is unobstructed. As a result, the first lens 14 is optically coupled with a corresponding second lens 34.

The female optical connector 10 further includes a number of female optical fibers (not shown), such as first transmitting optical fibers and first receiving optical fibers, inserted into the first support platform 12 and optically coupled to the female lens 14. The male optical connector 60 further includes a number of male optical fibers (not shown), such as second transmitting optical fibers and second receiving optical fibers, inserted into the male support platform 33 and optically coupled to the male lens 34. Each second receiving optical fiber is coupled to a corresponding first transmitting optical fiber through the first lens 14 and the second lens 34. Each first receiving optical fiber is coupled to a corresponding second transmitting optical fiber (not shown) through the first lens 14 and the second lens 34. Therefore, optical transmittance is not influenced by the female shielding plates 15 and the male shielding plates 35.

When the male optical connector 30 is detached from the female optical connector 10, the female shielding plates 15 rotate outwardly to cover the first opening 112 as the restoration of the female shielding plates 15, and the male shielding plates 35 rotate outwardly to cover the second opening 312 as the restoration of the male shielding plates 35.

In other embodiments, the female hollow pusher 13 may be a hollow cylinder, and the male hollow pusher 32 may be a hollow cylinder. When the male optical connector 30 is coupled with the female connector 10, the male shielding plates 35 are pressed between the circumference wall of the female hollow pusher 13 and the circumference wall of the male hollow pusher 32.

The embodiments shown and described above are only examples. Many details are often found in the art such as the other features of a female optical connector. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in the matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A female optical connector comprising:
  a female connector body comprising a female coupling surface, the female coupling surface defining a female receiving hole with an opening, the female connector body further comprising an end surface, a first surface, and a second surface in the female receiving hole, the end surface facing the opening and interconnected between the first surface and the second surface;
  a female hollow pusher extending from the end surface and received in the female receiving hole, the female hollow pusher being spaced apart from the first surface and the second surface;
  a female lens received in the receiving hole, the female lens for receiving and transmitting light therethough and into and out of a female optical connector; and two elastic female shielding plates having fixed ends fixed to the first surface and the second surface at opposite sides of the female receiving hole, and opposite free ends overlappable to cover the opening.

2. The female optical connector in claim 1, further comprising a female support platform with the female optical fiber inserted thereinto, wherein the female support platform extends from the end surface and received in the female hollow pusher, the female support platform has a light receiving surface facing toward the opening, and the female lens is formed on the light receiving surface.

3. The female optical connector in claim 1, wherein the first surface is substantially parallel to the second surface, two recesses are respectively defined in the first surface and the second surface for receiving the female shielding plates, and the recesses are positioned at a portion of the female receiving hole opposite from the end surface.

4. The female optical connector in claim 3, wherein the female hollow pusher is a rectangular frame and comprises a top wall and a bottom wall, the top wall is adjacent to the first surface, the bottom wall is substantially parallel to the top wall and is adjacent to the second surface, and a receiving space is formed between the female hollow pusher and the first and second surfaces.

5. The female optical connector in claim 1, wherein the female hollow pusher is substantially a cylinder.

* * * * *